US010288401B2

(12) United States Patent
Robicheau et al.

(10) Patent No.: US 10,288,401 B2
(45) Date of Patent: May 14, 2019

(54) MULTI-FUNCTION MEASURING INSTRUMENT

(71) Applicant: Hubbell Incorporated, Shelton, CT (US)

(72) Inventors: Richard E. Robicheau, Litchfield, NH (US); Daniel P. Owens, Brookline, NH (US)

(73) Assignee: HUBBELL INCORPORATED, Shelton, CT (US)

(*) Notice: Subject to any disclaimer, the term of this patent is extended or adjusted under 35 U.S.C. 154(b) by 102 days.

(21) Appl. No.: 15/382,129

(22) Filed: Dec. 16, 2016

(65) Prior Publication Data
US 2017/0176161 A1 Jun. 22, 2017

Related U.S. Application Data
(60) Provisional application No. 62/268,756, filed on Dec. 17, 2015.

(51) Int. Cl.
G01B 3/38 (2006.01)
G01B 5/08 (2006.01)
(52) U.S. Cl.
CPC .............. *G01B 3/38* (2013.01); *G01B 5/08* (2013.01)
(58) Field of Classification Search
CPC .................................. G01B 3/38; G01B 5/08
USPC .......................................... 33/810–812, 806
See application file for complete search history.

(56) References Cited

U.S. PATENT DOCUMENTS

| 1,424,492 | A | * | 8/1922 | Leschen | G01B 3/20 |
| | | | | | 33/810 |
| 2,668,464 | A | | 2/1954 | Paules | |
| 2,874,478 | A | | 2/1959 | Faulconer | |
| 4,665,064 | A | | 4/1987 | Hoback | |
| 4,730,399 | A | * | 3/1988 | Campbell | G01B 5/0025 |
| | | | | | 33/203 |
| 4,897,931 | A | * | 2/1990 | Goulette | G01B 3/20 |
| | | | | | 33/532 |
| 5,195,042 | A | | 3/1993 | Ferraro et al. | |
| 5,548,903 | A | * | 8/1996 | Johnson | G01B 3/20 |
| | | | | | 33/679.1 |
| 6,073,472 | A | | 6/2000 | Hollingsworth | |
| 2014/0007445 | A1 | * | 1/2014 | Yang | G01B 3/20 |
| | | | | | 33/811 |

OTHER PUBLICATIONS

International Search Report and Written Opinion dated Mar. 2, 2017 in corresponding PCT Application PCT/US16/67308.
Burndy Wiremike (TM) Brochure Mar. 2014.

* cited by examiner

*Primary Examiner* — Jonathan M Dunlap
(74) *Attorney, Agent, or Firm* — Wissing Miller LLP

(57) ABSTRACT

A measuring instrument that includes a main body and a slide arm. The main body has a first plate with a first set of measuring identifiers, a second plate with a second set of measuring identifiers, a channel between the first plate and the second plate, and a measuring arm. The slide arm has a measuring arm and a slide rail. The slide rail is positioned within the channel and movable relative to the main body. The slide rail also has a plurality of measuring markers that can align with at least one of the measuring identifiers.

21 Claims, 10 Drawing Sheets

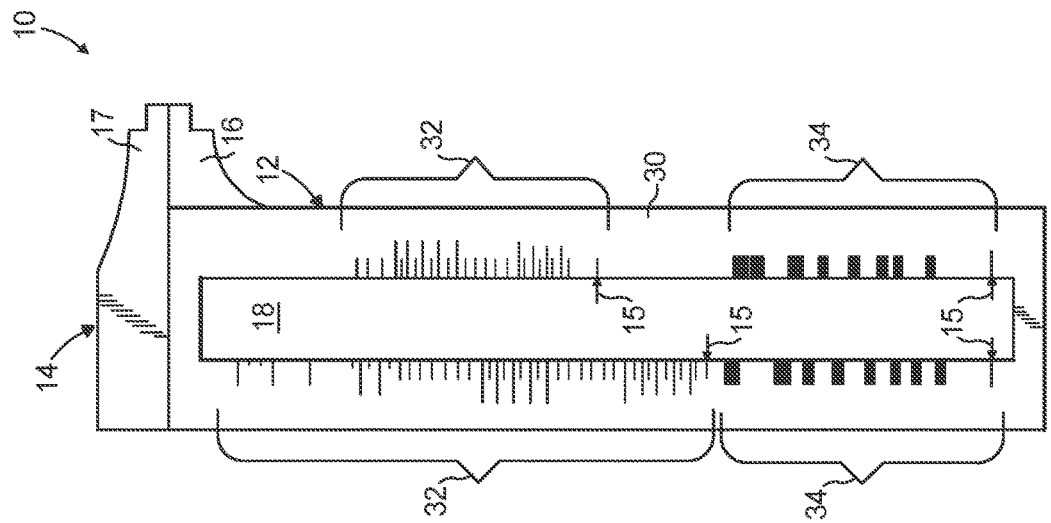
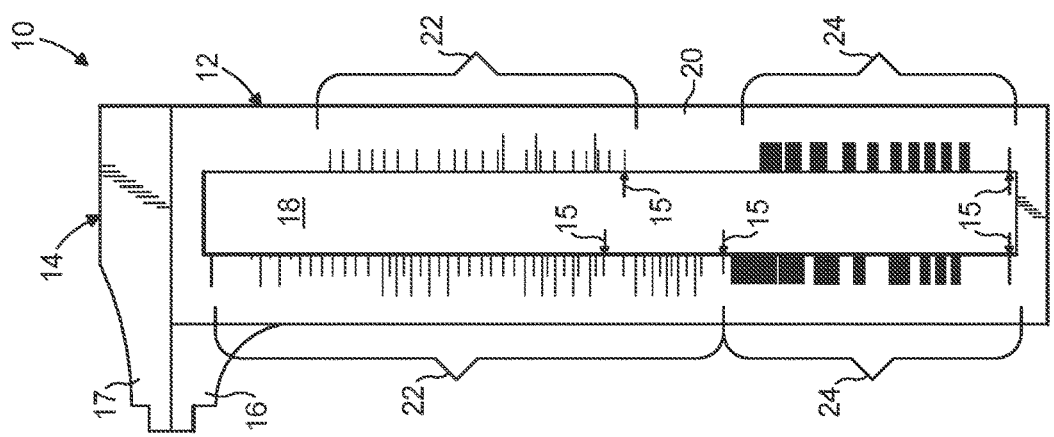

MULTI-FUNCTION MEASURING INSTRUMENT

CROSS REFERENCE TO RELATED APPLICATIONS

The present disclosure is based on and claims benefit from U.S. Provisional Application Ser. No. 62/268,756 filed Dec. 17, 2015 entitled "Multi-Function Measuring Instrument" the entire contents of which are herein incorporated by reference.

BACKGROUND

Field

The present disclosure relates generally to multi-function instruments for measuring characteristics associated with electrical wires and electrical connections. More particularly, the present disclosure relates to a multi-function instrument that can measure wire size in different metal compositions, and that can measure the resulting compression force of a crimp associated with wire connectors.

Description of the Related Art

Single function gauges used to measure for example the outer diameter of electrical conductors have been used to determine the size of a lug or connector to be used to terminate the conductor. Such single function gauges are limited to measuring a single characteristic of copper conductors, namely the outer diameter of copper conductors. However, conductors that are copper or aluminum are often used for high voltage, high current environments. Further, the size of the die needed to crimp the lug or connector to the conductor varies depending upon the size of the conductor. Having a multi-function measuring instrument that can measure multiple characteristics associated with electrical connections is needed.

SUMMARY

The present disclosure provides a measuring instrument. In one exemplary embodiment, the measuring instrument includes a main body having a first plate with a first set of measuring identifiers, a second plate with a second set of measuring identifiers, a channel between the first plate and the second plate, and a measuring arm. The measuring instrument also includes a slide arm having a measuring arm and a slide rail. The slide rail is positioned within the channel and movable relative to the main body. The slide rail also has a plurality of measuring markers that can align with at least one of the measuring identifiers.

In another exemplary embodiment, the multi-function measuring instrument includes a main body and a slide arm. The main body includes a pair of spacers, a first plate with a first set of measuring identifiers secured to a first side of each spacer, a second plate with a second set of measuring identifiers secured to a first side of each spacer and a first measuring arm extending from one of the spacers. The pair of spacers and a portion of the first plate and the second plate form a channel. The slide arm includes a second measuring arm and a slide rail. The slide rail is positioned within the channel and movable relative to the main body such that the second measuring arm can move away from or toward the first measuring arm. The slide rail includes a plurality of measuring markers such that when the slide rail is moved within the channel the measuring markers can align with at least one of the measuring identifiers, and a stop that engages at least one of the first plate or the second plate to prevent the slide arm from exiting the channel when the second measuring arm is moved away from the first measuring arm.

BRIEF DESCRIPTION OF THE DRAWINGS

The figures depict embodiments or configurations for purposes of illustration only. One skilled in the art will readily recognize from the following description that alternative embodiments or configuration of the structures illustrated herein may be employed without departing from the principles described herein, wherein:

FIG. 1 is a side elevation view of a first side of an exemplary embodiment of a measuring instrument according to the present disclosure;

FIG. 2 is a side elevation view of a second side of the measuring instrument of FIG. 1;

DETAILED DESCRIPTION

The present disclosure provides a multi-function measuring instrument that can measure multiple characteristics associated with electrical conductors or wires and resulting crimps of electrical wires within wire connectors. In one exemplary embodiment, the multi-function measuring instrument is a caliper type instrument that can measure the size of electrical wires in different metal compositions, and that can measure resulting compression force of crimps associated with wire connectors. Wire connectors as used herein includes taps, terminations, splices, lugs, couplers, connectors and any other end point where a wire is secured to connection type device by a crimp. The crimps can be made by crimp tools, e.g., power crimp tools, that have dies, or the crimps can be made by die-less crimp tools, such as power crimp tools with a nest and indentor. There are numerous types of dies that can be used in crimp tools with dies. For example, the dies can be U-type, W-type, P-type, S-type and/or X-type dies. The specification and drawings are to be regarded in an illustrative sense rather than a restrictive sense. Various modifications may be made thereto without departing from the spirit and scope of the present disclosure.

Figure 6:
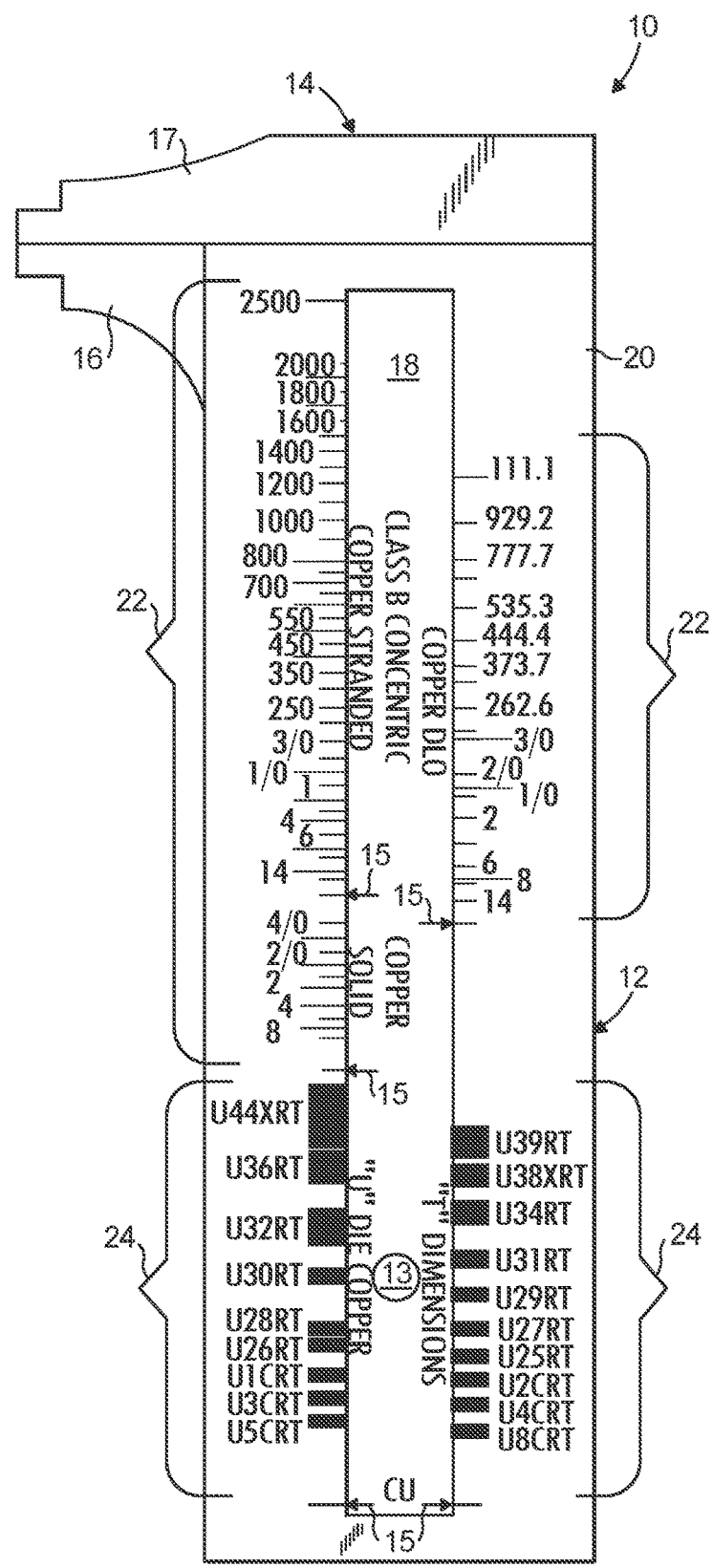
FIG. 6 is a side elevation view of the first side of an exemplary embodiment of a measuring instrument for measuring dimensions of copper wire.
Figure 7:
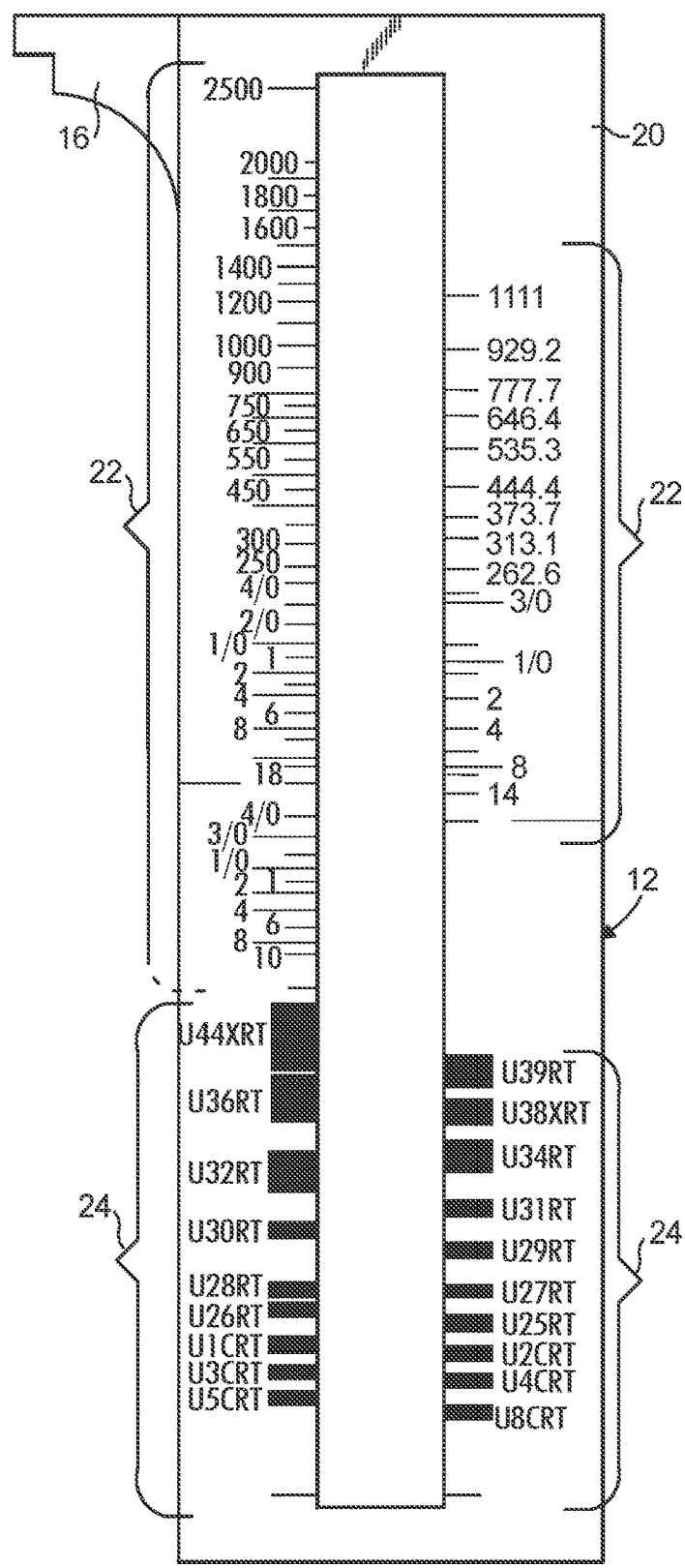
FIG. 7 is a side elevation view of a main body of the measuring instrument of FIG. 6.
Figure 8:
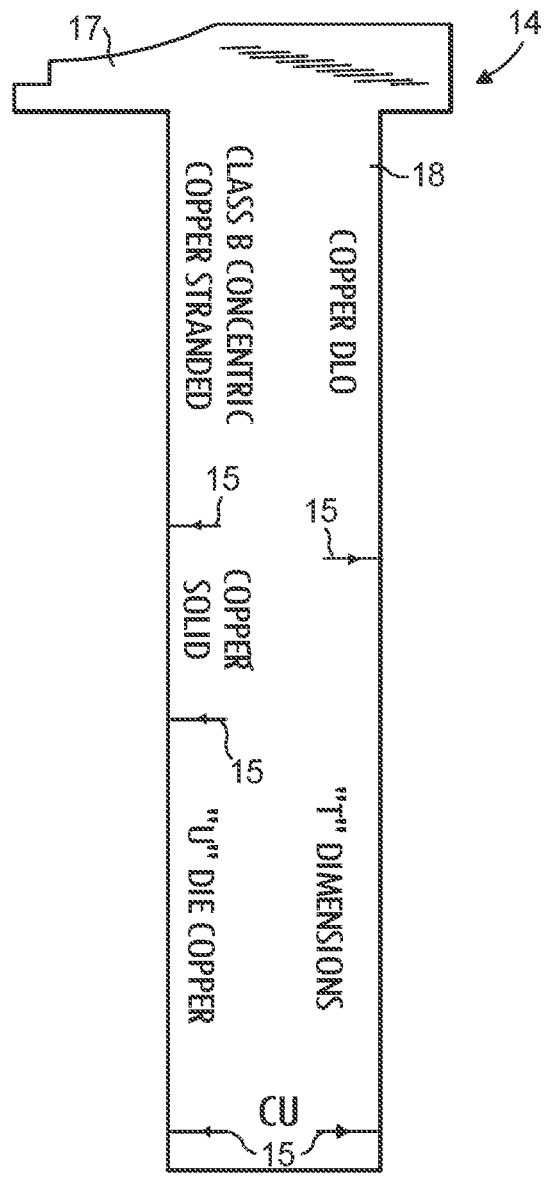
FIG. 8 is a side elevation view of a sliding arm of the measuring instrument of FIG. 6.

Referring to FIGS. 1-4, the multi-function measuring instrument 10 includes a main body 12 and a slide arm 14. The main body 12 has a first face plate 20 (seen in FIG. 1), a second face plate 30 (seen in FIG. 2), a pair of spacers 40 (seen in FIG. 4) that are spaced apart and secured between the first face plate and the second face plate and a measuring arm 16 extending from an upper end of one spacer 40. The first plate 20 and the second plate 30 are secured to the spacers 40 using for example spot welds, adhesives or mechanical fasteners such as set screws. The spacers 40 and portions of the first face plate 20 and second face plate 30 form a channel within which the slide arm 14 can fit within and slide relative to the main body 12, The first face plate 20 has a plurality of identifiers 22 that correspond to different electrical wire characteristics. For example, the identifiers 22 can be for electrical wire sizes, for example, for stranded wire, flex wire, and/or solid wire sizes. As another example, the identifiers 22 can correspond to Diesel Locomotive (DLO) cable. Table 1 below and FIGS. 6-8 provide an exemplary list of wire sizes, wire types, and the corresponding metal composition, e.g., copper, of the wire that can be measured by the multi-function measuring instrument 10. While the wire types identified in Table 1 are for solid, stranded and DLO types, one skilled in the art would readily appreciate that the wire types could be of other constructions. Further, while the wire sizes identified in Table 1 are American Wire Gauge sizes, e.g. MCM or AWG, one skilled in the art would readily appreciate that the wire sizes could be of other sizes, such as metric based wire sizes including $mm^2$ wire sizes.

TABLE 1

| Metal Composition | Wire Type | Wire Size |
|---|---|---|
| Copper | Stranded | 2500 MCM |
| Copper | Stranded | 2000 MCM |
| Copper | Stranded | 1900 MCM |
| Copper | Stranded | 1800 MCM |
| Copper | Stranded | 1700 MCM |
| Copper | Stranded | 1600 MCM |
| Copper | Stranded | 1500 MCM |
| Copper | Stranded | 1400 MCM |
| Copper | Stranded | 1300 MCM |
| Copper | Stranded | 1200 MCM |
| Copper | Stranded | 1100 MCM |
| Copper | Stranded | 1000 MCM |
| Copper | Stranded | 900 MCM |
| Copper | Stranded | 800 MCM |
| Copper | Stranded | 750 MCM |
| Copper | Stranded | 700 MCM |
| Copper | Stranded | 650 MCM |
| Copper | Stranded | 600 MCM |
| Copper | Stranded | 550 MCM |
| Copper | Stranded | 500 MCM |
| Copper | Stranded | 450 MCM |
| Copper | Stranded | 400 MCM |
| Copper | Stranded | 350 MCM |
| Copper | Stranded | 300 MCM |
| Copper | Stranded | 250 MCM |
| Copper | Stranded | 4/0 AWG |
| Copper | Stranded | 3/0 AWG |
| Copper | Stranded | 2/0 AWG |
| Copper | Stranded | 1/0 AWG |
| Copper | Stranded | 1 AWG |
| Copper | Stranded | 2 AWG |
| Copper | Stranded | 3 AWG |
| Copper | Stranded | 4 AWG |

TABLE 1-continued

| Metal Composition | Wire Type | Wire Size |
|---|---|---|
| Copper | Stranded | 6 AWG |
| Copper | Stranded | 8 AWG |
| Copper | Stranded | 10 AWG |
| Copper | Stranded | 14 AWG |
| Copper | Stranded | 16 AWG |
| Copper | Solid | 4/0 AWG |
| Copper | Solid | 3/0 AWG |
| Copper | Solid | 2/0 AWG |
| Copper | Solid | 1/0 AWG |
| Copper | Solid | 1 AWG |
| Copper | Solid | 2 AWG |
| Copper | Solid | 4 AWG |
| Copper | Solid | 6 AWG |
| Copper | Solid | 8 AWG |
| Copper | Solid | 10 AWG |
| Copper | DLO | 1111 AWG |
| Copper | DLO | 929.2 AWG |
| Copper | DLO | 777.7 AWG |
| Copper | DLO | 646.4 AWG |
| Copper | DLO | 535.3 AWG |
| Copper | DLO | 444.4 AWG |
| Copper | DLO | 373.7 AWG |
| Copper | DLO | 313.1 AWG |
| Copper | DLO | 262.6 AWG |
| Copper | DLO | 4/0 AWG |
| Copper | DLO | 3/0 AWG |
| Copper | DLO | 2/0 AWG |
| Copper | DLO | 1/0 AWG |
| Copper | DLO | 1 AWG |
| Copper | DLO | 2 AWG |
| Copper | DLO | 4 AWG |
| Copper | DLO | 6 AWG |
| Copper | DLO | 8 AWG |
| Copper | DLO | 10 AWG |
| Copper | DLO | 14 AWG |

Figure 5:
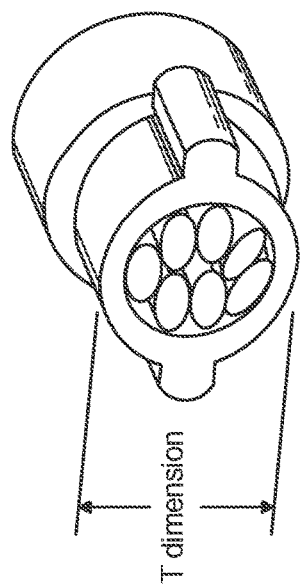
FIG. 5 is a side perspective view of a crimped wire within a wire connector.

The first face plate 20 also has a plurality of identifiers 24 that correspond to compression force range of crimps (shown as block regions) exerted by crimp dies, e.g., "U" type crimp dies, "W" type crimp dies or other crimp dies, used in a power crimping tool, and used to crimp wires to wire connectors. For example, the identifiers 24 can be the compression force range dimensions exerted by "U" type crimp dies used with known power crimping tools, and are measured by a "T" dimension, which is a dimension measured to ensure the correct die type, e.g., "U" type die or "W" type die, was used to crimp a wire connector to a wire. The "T" dimension, shown in FIG. 5, represents the outer periphery of a wire connector after a wire has been crimped within the wire connector by a die and crimping tool. After being crimped the outer periphery of the wire connector will be compressed and altered by the crimp. As a result, the "T" dimension range on the multi-function measuring instrument 10 identifies whether the proper die and crimp force was used to crimp a wire to a wire connector. Table 2 below and FIGS. 6-8 provide an exemplary list of compression force ranges exerted by "U" type dies, and respective "T" dimensions on certain metal, e.g., copper, compositions that can be measured by the multi-function measuring instrument 10. However, while the exemplary embodiments described herein are associated with the use of crimp tools with dies, the multi-function measuring instrument 10 can be configured for use with die-less crimp tools or for use with die type crimp tools in combination with die-less crimp tools.

TABLE 2

| Metal Composition | Die Type | Range |
|---|---|---|
| Copper | U44XRT | 12-15 tons |
| Copper | U36RT | 12-15 tons |
| Copper | U32RT | 12-15 tons |
| Copper | U30RT | 12-15 tons |
| Copper | U28RT | 12-15 tons |
| Copper | U26RT | 12-15 tons |
| Copper | U1CRT | 12-15 tons |
| Copper | U3CRT | 12-15 tons |
| Copper | U5CRT | 12-15 tons |
| Copper | U35RT | 12-15 tons |
| Copper | U38XRT | 12-15 tons |
| Copper | U34RT | 12-15 tons |
| Copper | U31RT | 12-15 tons |
| Copper | U29RT | 12-15 tons |
| Copper | U27RT | 12-15 tons |
| Copper | U26RT | 12-15 tons |
| Copper | U2CRT | 12-15 tons |
| Copper | U4CRT | 12-15 tons |
| Copper | U8CRT | 12-15 tons |

Figure 9:
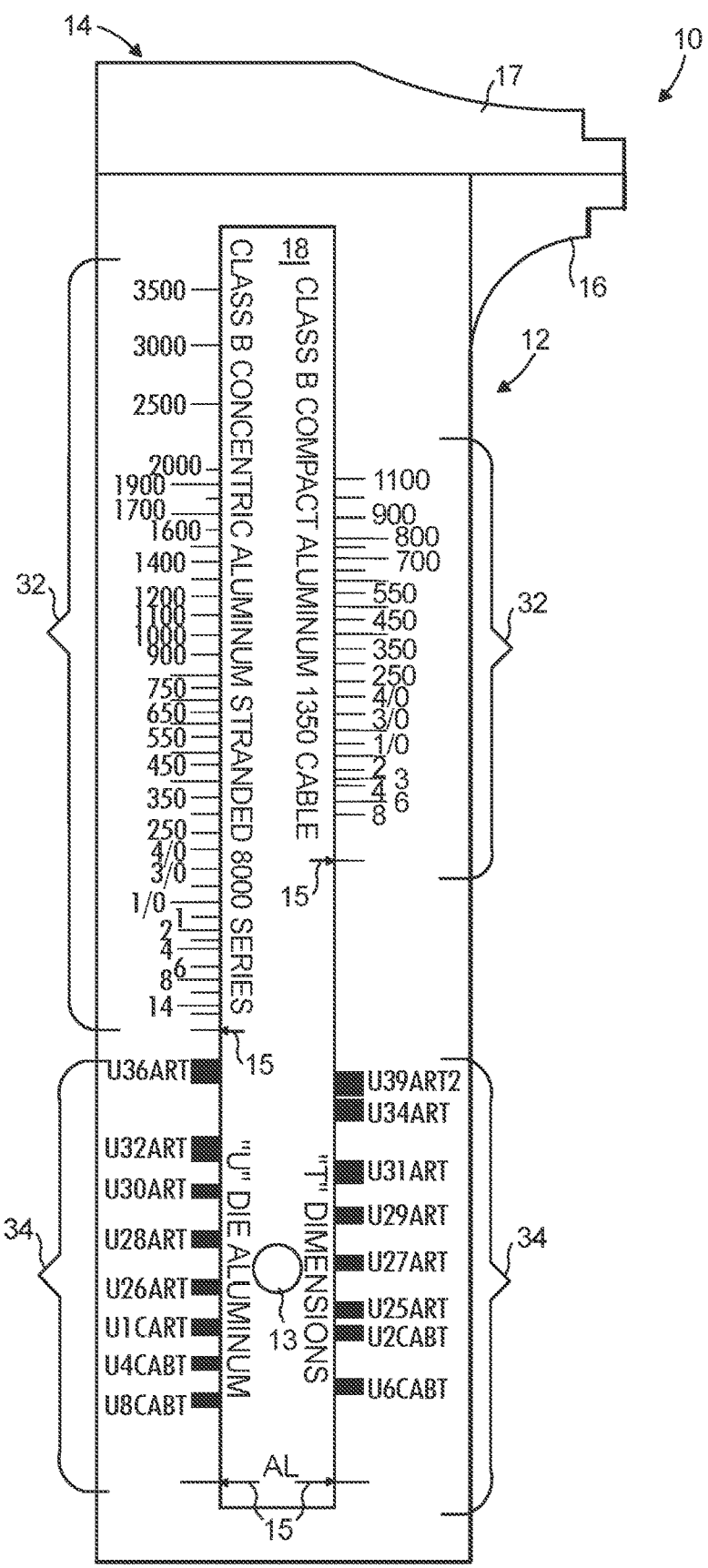
FIG. 9 is a side elevation view of the second side of an exemplary embodiment of a measuring instrument for measuring dimensions of aluminum wire.
Figure 10:
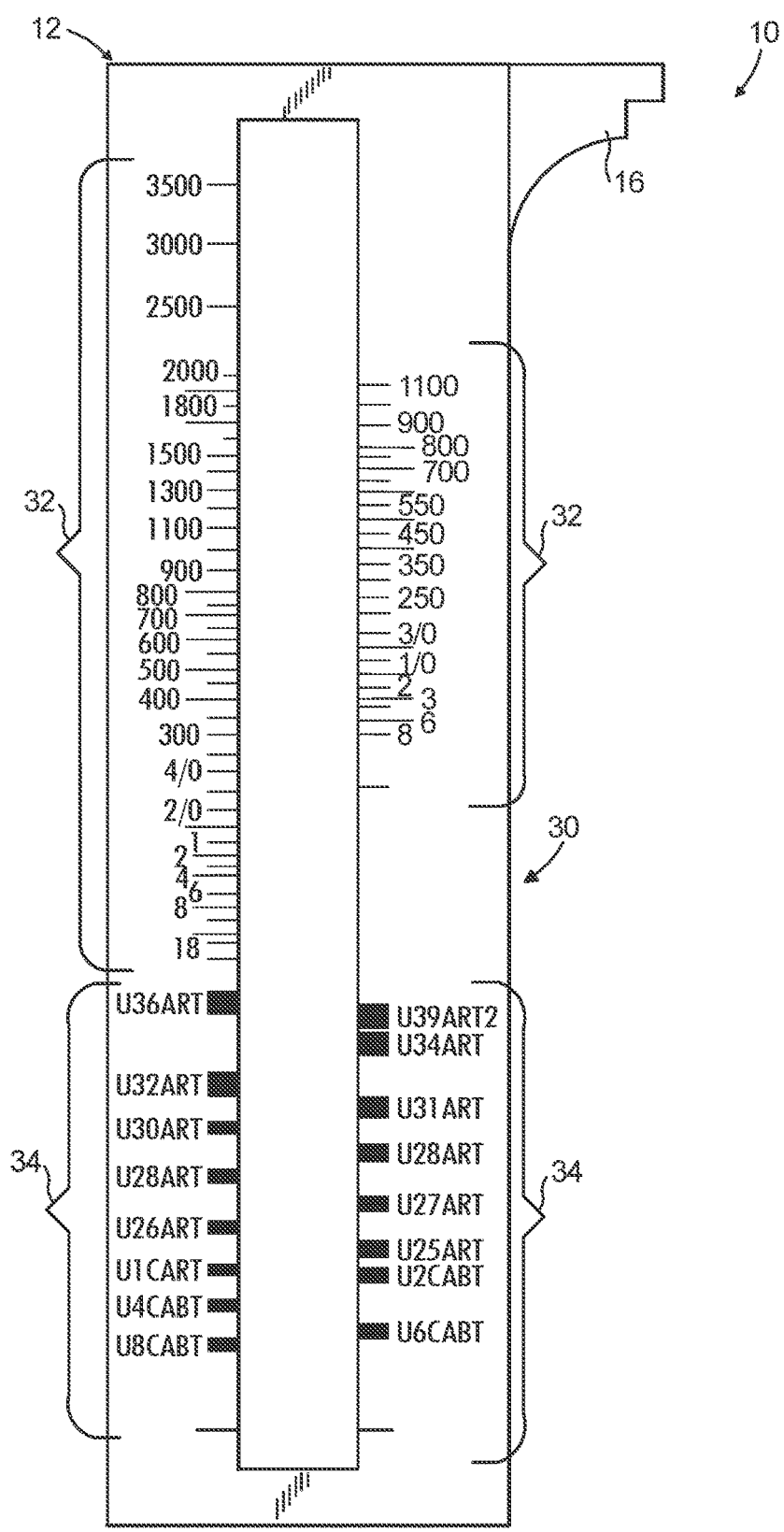
FIG. 10 is a side elevation view of a main body of the measuring instrument of FIG. 9.
Figure 11:
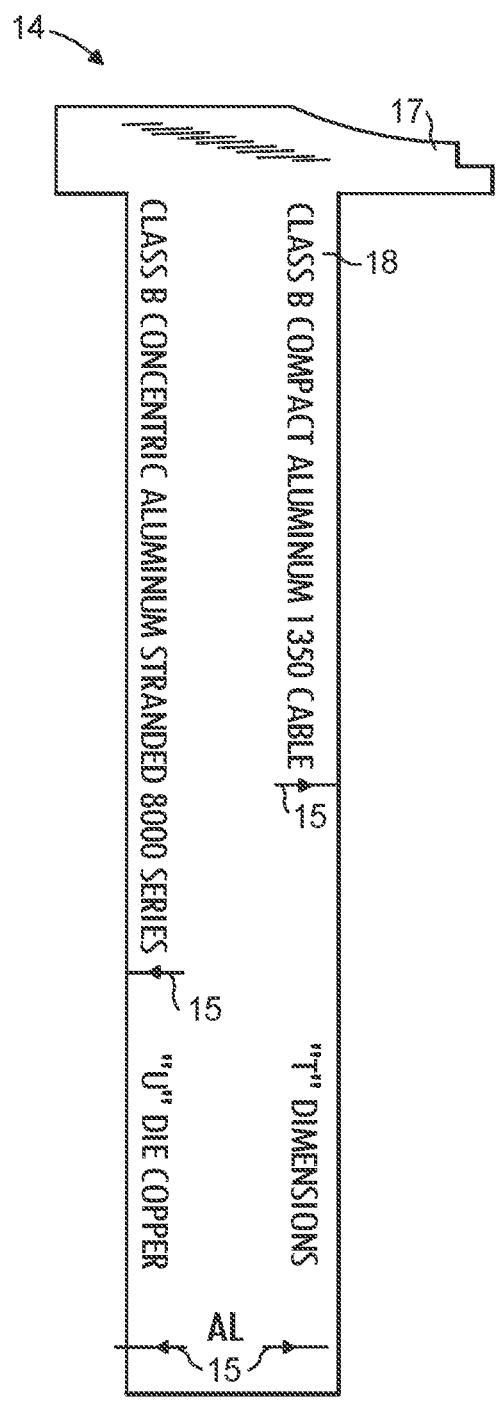
FIG. 11 is a side elevation view of a sliding arm of the measuring instrument of FIG. 9.

The second face plate 30 also has a plurality of identifiers 32 that correspond to different electrical wire characteristics. For example, the identifiers 32 can be for electrical wire sizes for stranded wire, flex wire, and/or solid wire sizes. As another example, the identifiers 32 can correspond to 1350 compact cable. Table 3 below and FIGS. 9-11 provide an exemplary list of wire sizes, wire types, and the corresponding metal composition, e.g., aluminum, of the wire that can be measured by the multi-function measuring instrument 10. As noted above, while the wire types identified in Table 3 are for solid, stranded and DLO types, one skilled in the art would readily appreciate that the wire types could be of other constructions. Further, while the wire sizes identified in Table 3 are American Wire Gauge sizes, e.g. MCM or AWG, one skilled in the art would readily appreciate that the wire sizes could be of other sizes, such as metric based wire sizes including mm² wire sizes.

TABLE 3

| Metal Composition | Wire Type | Wire Size |
|---|---|---|
| Aluminum | Stranded | 3500 MCM |
| Aluminum | Stranded | 3000 MCM |
| Aluminum | Stranded | 2500 MCM |
| Aluminum | Stranded | 2000 MCM |
| Aluminum | Stranded | 1900 MCM |
| Aluminum | Stranded | 1800 MCM |
| Aluminum | Stranded | 1700 MCM |
| Aluminum | Stranded | 1600 MCM |
| Aluminum | Stranded | 1500 MCM |
| Aluminum | Stranded | 1400 MCM |
| Aluminum | Stranded | 1300 MCM |
| Aluminum | Stranded | 1200 MCM |
| Aluminum | Stranded | 1100 MCM |
| Aluminum | Stranded | 1000 MCM |
| Aluminum | Stranded | 900 MCM |
| Aluminum | Stranded | 800 MCM |
| Aluminum | Stranded | 750 MCM |
| Aluminum | Stranded | 700 MCM |
| Aluminum | Stranded | 650 MCM |
| Aluminum | Stranded | 600 MCM |
| Aluminum | Stranded | 550 MCM |
| Aluminum | Stranded | 500 MCM |
| Aluminum | Stranded | 450 MCM |
| Aluminum | Stranded | 400 MCM |
| Aluminum | Stranded | 350 MCM |
| Aluminum | Stranded | 300 MCM |
| Aluminum | Stranded | 250 MCM |
| Aluminum | Stranded | 4/0 AWG |
| Aluminum | Stranded | 3/0 AWG |
| Aluminum | Stranded | 2/0 AWG |
| Aluminum | Stranded | 1/0 AWG |
| Aluminum | Stranded | 1 AWG |
| Aluminum | Stranded | 2 AWG |
| Aluminum | Stranded | 3 AWG |
| Aluminum | Stranded | 4 AWG |
| Aluminum | Stranded | 6 AWG |
| Aluminum | Stranded | 8 AWG |
| Aluminum | Stranded | 10 AWG |
| Aluminum | Stranded | 14 AWG |
| Aluminum | Stranded | 18 AWG |
| Aluminum | Compact 1350 | 1100 MCM |
| Aluminum | Compact 1350 | 1000 MCM |
| Aluminum | Compact 1350 | 900 MCM |
| Aluminum | Compact 1350 | 800 MCM |
| Aluminum | Compact 1350 | 750 MCM |
| Aluminum | Compact 1350 | 700 MCM |
| Aluminum | Compact 1350 | 650 MCM |
| Aluminum | Compact 1350 | 600 MCM |
| Aluminum | Compact 1350 | 550 MCM |
| Aluminum | Compact 1350 | 500 MCM |
| Aluminum | Compact 1350 | 450 MCM |
| Aluminum | Compact 1350 | 400 MCM |
| Aluminum | Compact 1350 | 350 MCM |
| Aluminum | Compact 1350 | 300 MCM |
| Aluminum | Compact 1350 | 250 MCM |
| Aluminum | Compact 1350 | 4/0 AWG |
| Aluminum | Compact 1350 | 3/0 AWG |
| Aluminum | Compact 1350 | 2/0 AWG |
| Aluminum | Compact 1350 | 1/0 AWG |
| Aluminum | Compact 1350 | 1 AWG |
| Aluminum | Compact 1350 | 2 AWG |
| Aluminum | Compact 1350 | 3 AWG |
| Aluminum | Compact 1350 | 4 AWG |
| Aluminum | Compact 1350 | 6 AWG |
| Aluminum | Compact 1350 | 8 AWG |

The second face plate 30 also has a plurality of identifiers 34 that correspond to compression force range of crimps (shown as block regions) exerted by crimp dies, e.g., "U" type crimp dies, "W" type crimp dies or other crimp dies, used in a power crimping tool, and used to crimp a wire to wire connector. For example, the identifiers 34 can be the compression force range dimensions exerted by known "U" type crimp dies used with known crimping tools, and are measured by a "T" dimension, which is a dimension measured to ensure the correct die type, e.g., "U" type die, was used to crimp a wire connector to a wire. Table 4 below and FIGS. 9-11 provide an exemplary list of compression force ranges exerted by "U" type dies, and respective "T" dimensions of certain metal compositions, e.g., aluminum, that can be measured by the multi-function measuring instrument 10. However, as noted above while the exemplary embodiments described herein are associated with the use of crimp tools with dies, the multi-function measuring instrument 10 can be configured for use with die-less crimp tools or for use with die type crimp tools in combination with die-less crimp tools.

TABLE 4

| Metal Composition | Die Type | Range |
|---|---|---|
| Aluminum | U36ART | 12-15 tons |
| Aluminum | U32ART | 12-15 tons |
| Aluminum | U30ART | 12-15 tons |
| Aluminum | U28ART | 12-15 tons |
| Aluminum | U26ART | 12-15 tons |

TABLE 4-continued

| Metal Composition | Die Type | Range |
|---|---|---|
| Aluminum | U1CART | 12-15 tons |
| Aluminum | U4CABT | 12-15 tons |
| Aluminum | U8CABT | 12-15 tons |
| Aluminum | U39ART2 | 12-15 tons |
| Aluminum | U34ART | 12-15 tons |
| Aluminum | U31ART | 12-15 tons |
| Aluminum | U29ART | 12-15 tons |
| Aluminum | U27ART | 12-15 tons |
| Aluminum | U25ART | 12-15 tons |
| Aluminum | U2CABT | 12-15 tons |
| Aluminum | U4CRT | 12-15 tons |
| Aluminum | U8CRT | 12-15 tons |

Figure 4:
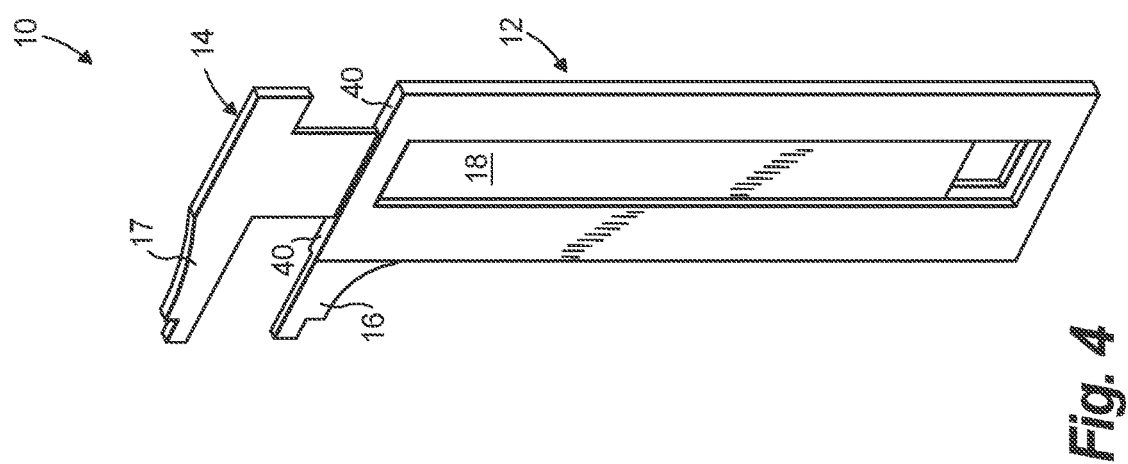
FIG. 4 is a perspective view of the measuring instrument of FIG. 1.
Figure 3:
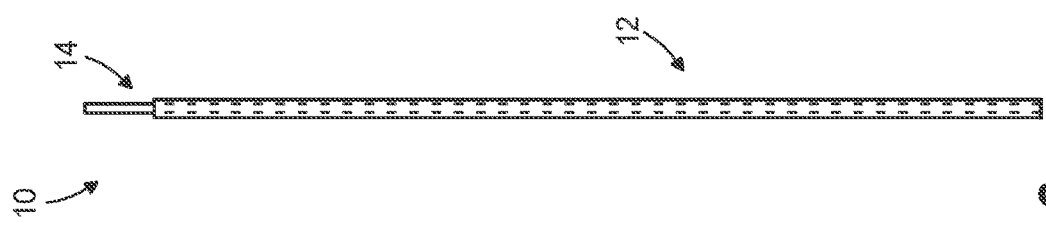
FIG. 3 is an end elevation view of the measuring instrument of FIG. 1.
Figure 12:
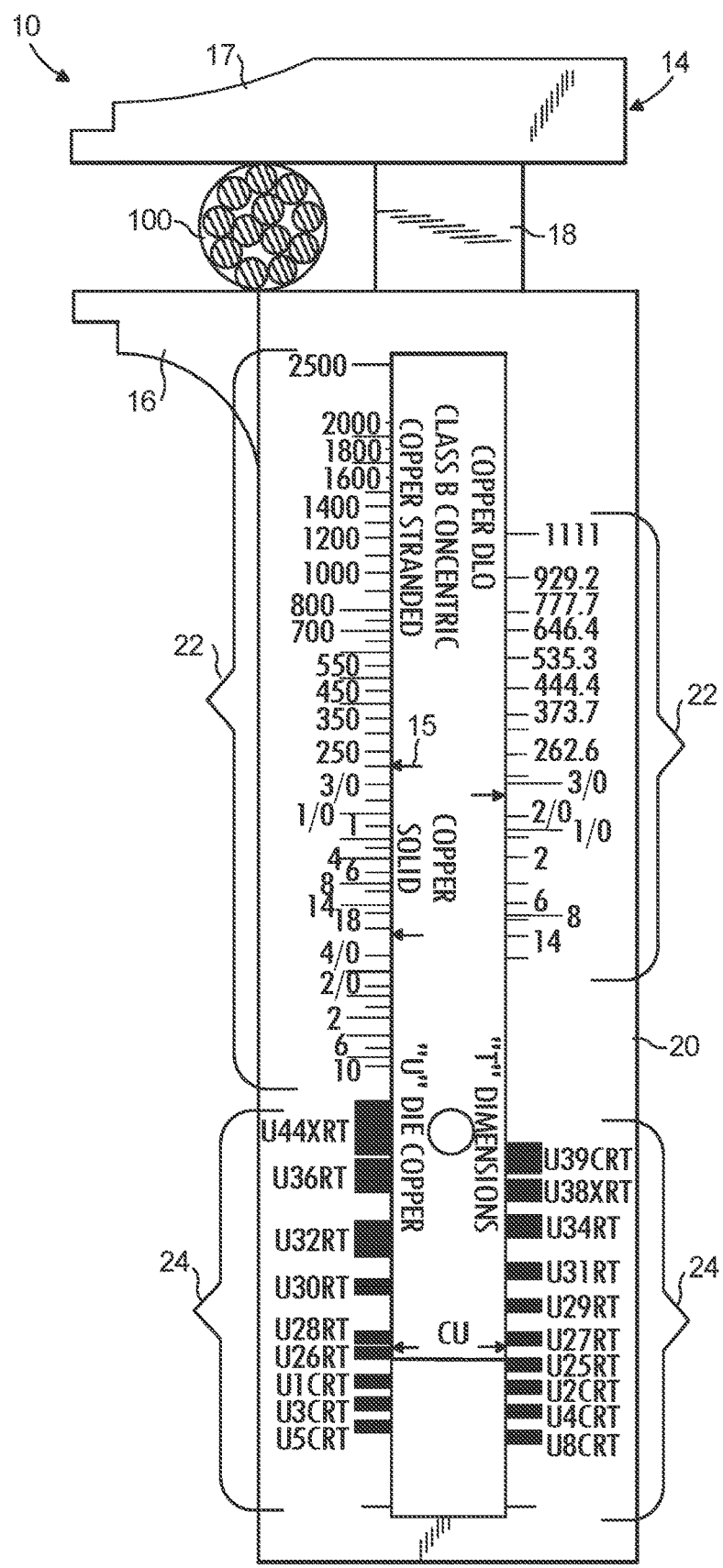
FIG. 12 is a side elevation view of the first side of the measuring instrument of FIG. 6 with a stranded copper wire positioned between the main body and slide arm for measurement.

The slide arm 14 is configured to fit within and slide within the channel between the face plates 20 and 30 of the main body 12, as shown in FIG. 4. The slide arm 14, seen for example in FIG. 8, includes a measuring arm 17 connected to a slide rail 18. The measuring arm 17 extends from an upper surface of the slide rail 18, and the slide rail rests within the channel between the face plates. As such, the slide arm 14 can slide relative to the main body 12. The stop 13, e.g., a detent on one side of the slide rail 18, seen in FIG. 9, prevents the slide arm 14 from sliding out of the channel when the measuring arm 17 of the slide arm 14 is moved away from the measuring arm 16 of the main body 12. The slide arm 14 also includes one or more measuring markers 15, which in this exemplary embodiment comprises measuring markers 15a-15e. The measuring markers 15 are intended to align with respective identifiers 22, 24, 32 and/or 34 when making a measurement. For example, as seen in FIG. 12, a stranded copper wire 100 is positioned between the measuring arm 16 and measuring arm 17. Using the copper (CU) side of the slide arm 14, measuring marker 15a reflects that the measured wire size (identifier 22) is a 4/0 AWG stranded copper wire. If the wire was a solid wire type, then the measuring marker 15b would be used to measure the wire size. If the wire type were a DLO wire type, then the measuring marker 15c would be used to measure the wire size. If a lug or connector were crimped to a copper wire and the crimped lug or connector were placed between the measuring arms 16 and 17, the measuring markers 15d and 15e would be used to measure the compression force range and "T" dimension. If the wire being measured was aluminium, then the aluminium (AL) side of the slide arm 14 would be used to make the above measurements.

Figure 13:
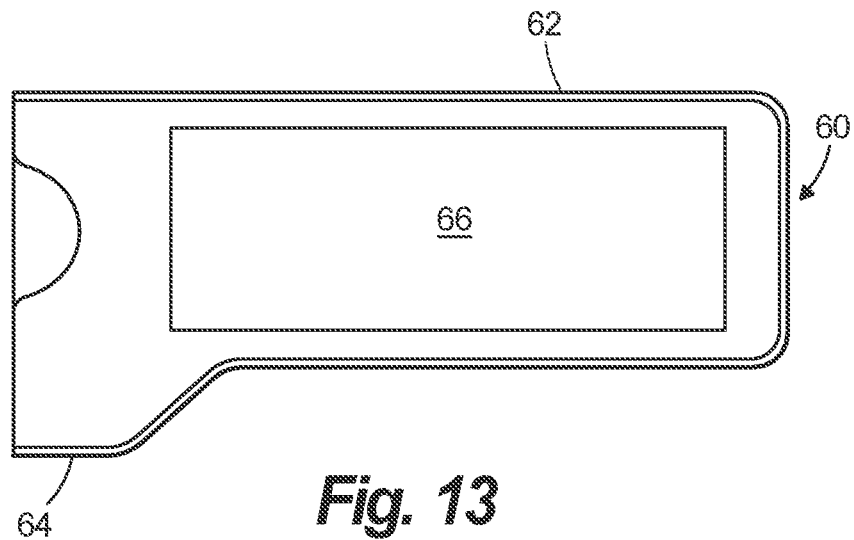
FIG. 13 is a top plan view of a carrying sleeve for storing the measuring instrument of the present disclosure.
Figure 14:
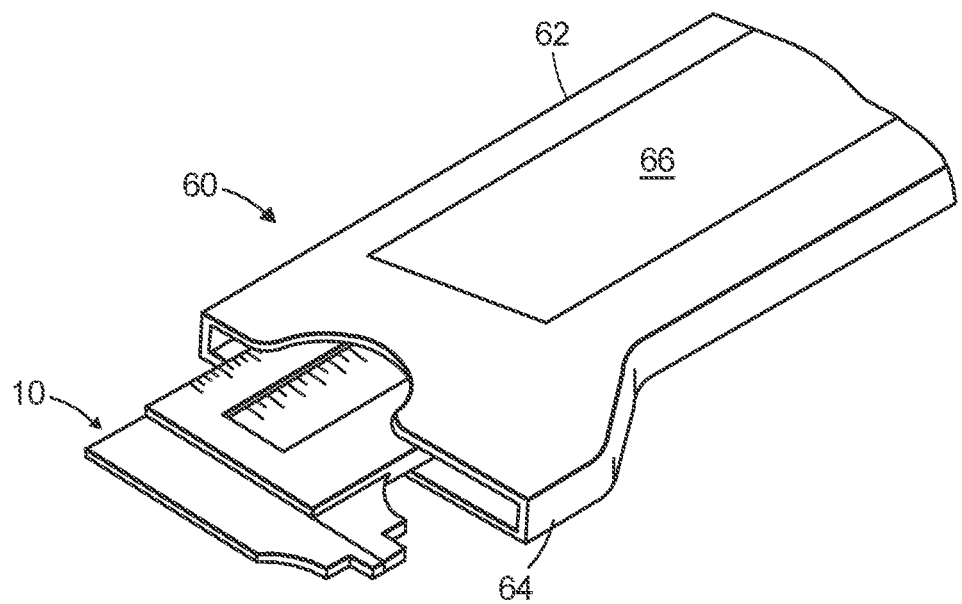
FIG. 14 is a top perspective view of the sleeve of FIG. 13 with the measuring instrument of FIG. 1 inserted into the carrying sleeve.

Referring to FIGS. 13 and 14, a carrying case or sleeve 60 may be provided to house the measuring device 10 when not in use. The sleeve 60 has a bottom portion 62 and a top portion 64. The bottom portion 62 receives the main body 12 and the slide rail 18 of the slide arm 14. The top portion 64 receives the measuring arm 16 of the main body 12 and the measuring arm 17 of the slide arm 14. The sleeve 60 may include an area 66 for a corporate logo, and/or may include an area for other information for the user, such as a conversion table.

However, it will be understood that various modifications can be made to the configurations of the present disclosure herein without departing from the spirit and scope thereof. Therefore, the above description should not be construed as limiting the disclosure, but merely as embodiments or configurations thereof. Those skilled in the art will envision other modifications within the scope and spirit of the invention as defined by the claims appended hereto.

What is claimed is:

1. A multi-function measuring instrument comprising:
a main body having a pair of spacers, a first plate with a first set of measuring identifiers secured to a first side of each spacer, a second plate with a second set of measuring identifiers secured to a first side of each spacer, wherein the pair of spacers and a portion of the first plate and the second plate form a channel, and a first measuring arm extending from one of the spacers, and wherein the first set of identifiers comprise at least one electrical wire characteristic for copper wire and at least one compression force range for copper wire associated with a predefined die type; and
a slide arm having a second measuring arm and a slide rail, wherein the slide rail is positioned within the channel and movable relative to the main body such that the second measuring arm can move away from or toward the first measuring arm, the slide rail also having a plurality of measuring markers such that when the slide rail is moved within the channel the measuring markers can align with at least one of the measuring identifiers.

2. The multi-function measuring instrument according to claim 1, wherein the predetermined die type comprises a U type die.

3. The multi-function measuring instrument according to claim 1, wherein the predetermined die type comprises a W type die.

4. The multi-function measuring instrument according to claim 1, wherein the at least one electrical wire characteristic for copper wire comprises a wire size.

5. The multi-function measuring instrument according to claim 1, wherein the at least one electrical wire characteristic for copper wire comprises a wire type.

6. The multi-function measuring instrument according to claim 5, wherein the wire type comprises solid, stranded and DLO wire types.

7. The multi-function measuring instrument according to claim 1, wherein the first set of identifiers comprise at least one electrical wire characteristic for copper wire and at least one compression force range for copper wire associated with a die-less type crimp.

8. The multi-function measuring instrument according to claim 1, wherein the second set of identifiers comprise at least one electrical wire characteristic for aluminum wire and at least one compression force range for aluminum wire associated with a predefined die type.

9. The multi-function measuring instrument according to claim 8, wherein the predetermined die type comprises a U type die.

10. The multi-function measuring instrument according to claim 8, wherein the predetermined die type comprises a W type die.

11. The multi-function measuring instrument according to claim 8, wherein the at least one electrical wire characteristic for aluminum wire comprises a wire size.

12. The multi-function measuring instrument according to claim 8, wherein the at least one electrical wire characteristic for aluminum wire comprises a wire type.

13. The multi-function measuring instrument according to claim 12, wherein the wire type comprises solid, stranded and DLO wire types.

14. The multi-function measuring instrument according to claim 1, wherein the second set of identifiers comprise at least one electrical wire characteristic for aluminum wire and at least one compression force range for aluminum wire associated with a die-less type crimp.

15. The multi-function measuring instrument according to claim 1, wherein the slide rail further comprises a stop that engages at least one of the first plate and the second plate to prevent the slide arm from exiting the channel when the second measuring arm is moved away from the first measuring arm.

16. The multi-function measuring instrument according to claim 15, wherein the stop comprises a detent.

17. A multi-function measuring instrument comprising:
   a main body having a pair of spacers, a first plate with a first set of measuring identifiers secured to a first side of each spacer, a second plate with a second set of measuring identifiers secured to a first side of each spacer, wherein the pair of spacers and a portion of the first plate and the second plate form a channel, and a first measuring arm extending from one of the spacers, and wherein the first set of identifiers comprise at least one electrical wire characteristic for copper wire and at least one compression force range for copper wire associated with a predefined die type; and
   a slide arm having a second measuring arm and a slide rail, wherein the slide rail is positioned within the channel and movable relative to the main body such that the second measuring arm can move away from or toward the first measuring arm, the slide rail comprise a plurality of measuring markers such that when the slide rail is moved within the channel the measuring markers can align with at least one of the measuring identifiers, and a stop that engages at least one of the first plate and the second plate to prevent the slide arm from exiting the channel when the second measuring arm is moved away from the first measuring arm.

18. The multi-function measuring instrument according to claim 17, wherein the first set of identifiers comprise at least one electrical wire characteristic for copper wire and at least one compression force range for copper wire associated with a die-less type crimp.

19. The multi-function measuring instrument according to claim 17, wherein the second set of identifiers comprise at least one electrical wire characteristic for aluminum wire and at least one compression force range for aluminum wire associated with a predefined die type.

20. The multi-function measuring instrument according to claim 17, wherein the second set of identifiers comprise at least one electrical wire characteristic for aluminum wire and at least one compression force range for aluminum wire associated with a die-less type crimp.

21. The multi-function measuring instrument according to claim 17, wherein the stop comprises a detent.

\* \* \* \* \*